July 3, 1956   P. E. R. FAUVELOT   2,752,783
REMOTELY OPERATED LEVEL GAGES
Filed Nov. 25, 1953
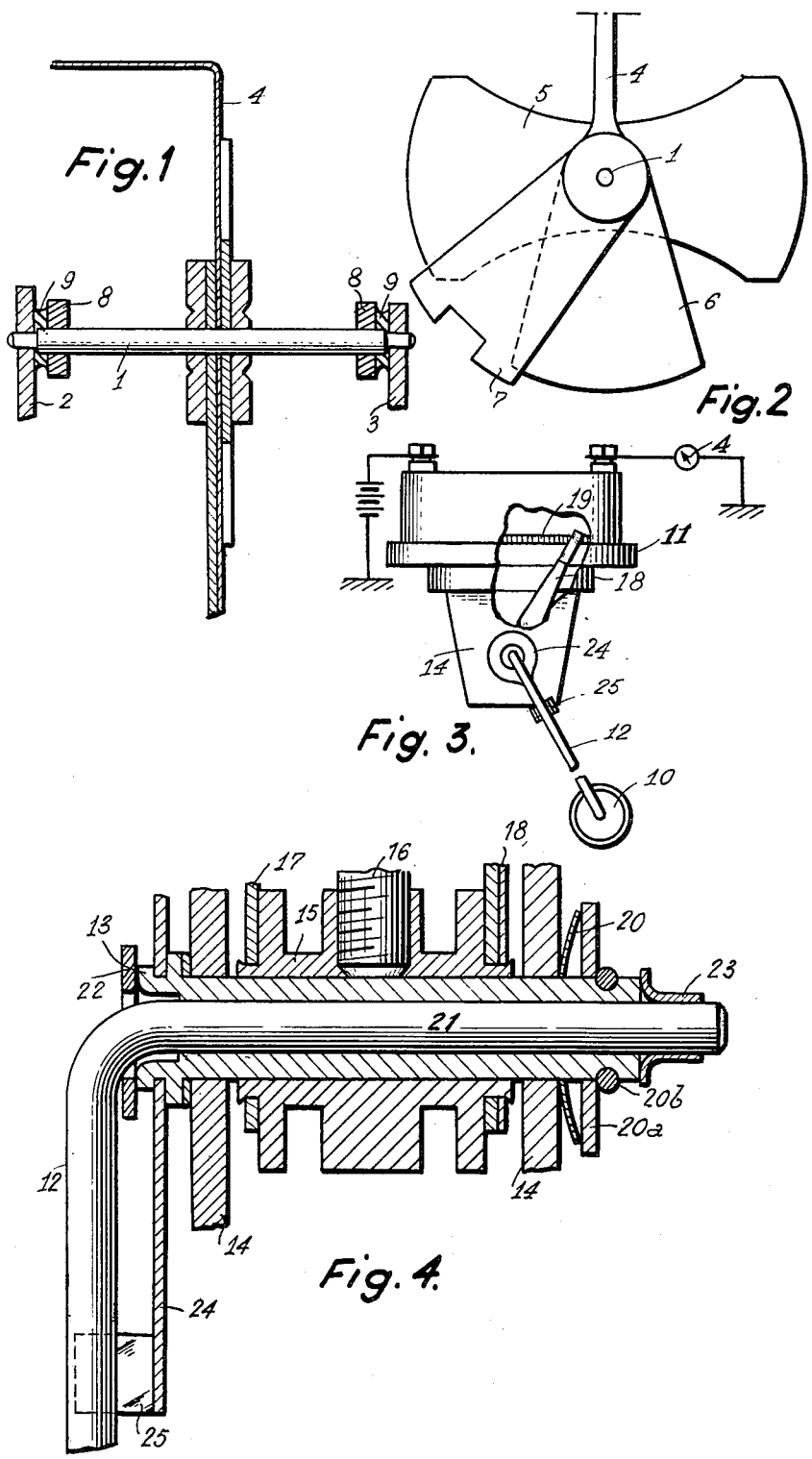

United States Patent Office 2,752,783
Patented July 3, 1956

2,752,783

REMOTELY OPERATED LEVEL GAGES

Pierre Ernest René Fauvelot, Ville-d'Avray, France, assignor to Societe Anonyme Etablissements Ed. Jaeger, Levallois-Perret, France Application November 25, 1953, Serial No. 394,466

Claims priority, application France November 28, 1952

1 Claim. (Cl. 73—313)

Electrically operated gages used for the remote reading of the level of a liquid subject to agitation lack of precision for several reasons: first, whatever the provisions made for increasing the difference between the natural frequency of oscillation of the movable member of the reading device and the mean frequency of the liquid waves, the reading index is subject to a continual oscillation and, secondly, the sensitive means comprise a float which follows up the waves of the liquid and transmits them integrally to the electric means. The consequence thereof is a very poor precision. This is a serious inconvenience in the case, for example, of a vehicle fuel gage.

The main object of the present invention is to remove such drawbacks of the known devices by providing in a conventional remotely operated level gage means for preserving the reading index from the stirring of the liquid to be gaged.

According to the invention, therefore, the oscillations of the indicating movable member are damped by supplying the bearings thereof with a viscous lubricant such as, preferably, a silicone oil.

Conveniently, said movable member is pivoted between two bearings, and the pivots are provided, adjacent the end journals, with flat collars separated from the bearing faces by a narrow clearance filled with a drop of silicone oil.

Moreover, according to the invention, the gaging float may be connected with a lost motion to the electric transmission control means, whereby the latter assume a mean position unaffected by the agitation of the float.

The extent of the lost motion referred to above is preferably in accordance with the mean amplitude of the liquid waves.

Through these two distinct means, the reliability of the reading may be substantially improved. When combining said two means, the indication given by the reading index is accurate and completely steady.

For a better understanding of the invention, an embodiment thereof will be now described more fully by way of example with reference to the accompanying drawings, in which:

Figure 1 is a diagrammatical section of the pivot means of a gage reading device.

Figure 2 is a partial front view of the movable member of the reading device.

Figure 3 is a diagrammatical view of an electrically operated gage according to the invention, wherein the float is partly torn off.

Figure 4 is a detailed sectional view at a greater scale of the pivoting means of the float arm.

A level gage reading device of the galvanometer or quotientmeter type comprises a pivoting shaft 1 mounted between two bearings 2, 3. The axial abutments of the shaft 1 are provided by shoulders formed on the shaft at the inner end of either bearing journal. As usual in apparatus of this kind, the shaft 1 carries a hand 4, a magnetic armature 5, a counterweight 6 (if wanted), and a compensating element 7. The hand 4 may be straight or cranked. The excitation windings are not shown for the sake of clarity in the figure.

Adjacent the pivot journals, small flat collars 8 are forcibly driven on the shaft 1 to such a position that they will be at a small distance from the bearing bodies 2, 3. This distance is chosen so small that a drop of liquid 9 is retained by capillarity between the collars and the bearings. Said liquid is selected to be both damping and lubricating, inalterable for a very long time, and quite unaffected by the contacting materials and by bad weather conditions. Conveniently, the selected liquid will be a silicone oil having the forementioned properties.

The damping effect depends on the area of collars 8. The natural disordered movements of the movable member are thus entirely eliminated.

For damping the effects of the agitation of the liquid to be gaged, the float 10 mounted on the support 11 of the remote control device fitted to the upper wall of a fuel tank, in a motorcar for instance, is provided with a cranked lever 12 pivoting freely in a sleeve 13. Said sleeve 13 is pivoted in bearings provided in the side-plates 14 of the support 11 and is made fast with a brush-carrier 15 by a set-screw 16. On the carrier 15 are secured in the usual way two brushes 17, 18 acting as receiving members for said remote control device and adapted to sweep a potentiometer winding 19 fixed in the casing of the float-fitting 11.

The sleeve 13 is preferably provided with a shoulder abutting one of the side-plates 14 through a plastic washer and is maintained in abutting engagement by an elastic washer 20 compressed between the other side-plate 14 and an inserted washer 20a stopped by a circlet 20b engaging a groove of the sleeve 13. The bent part 21 of the lever 12 rotates freely within the sleeve 13 and is retained axially by a safety washer 22 slipped into the bent angle and by a flanged thimble 23 forcibly driven on the projecting end of said part 21.

Near the bend, the end of the sleeve 13 is turned out to secure thereon the arm 24 carrying a forked dog 25 which straddles the lever 12 with a small clearance preferably equal to the amplitude of movement of the point where the rod 12 engages said dog 25 which corresponds to the mean wave depth of the liquid surface.

In this way, the arm 24 will remain in the mean position corresponding to the level of the liquid when unagitated.

Of course, without departing from the scope of the present invention, modifications may be made to the described embodiment. Thus, the float-fitting 11 may conveniently be provided with a vent and with a tube for the suction of the fuel, so as to reduce the number of apertures to be made in the tank wall. Moreover, the transmission from the float to the reading device could be made by any suitable means other than electric means.

What I claim is:

In a remotely operated level gage of the type comprising a float following the level of the liquid to be gaged and transmitting the variations of said level to the receiving member of a remote control device which drives a pivotal reading index of a reading device, means for maintaining the receiving member in the mean position corresponding to the level of the liquid at rest comprising a sleeve pivotally mounted on the remote control device which, in turn, is fitted to the upper wall of the tank containing the liquid to be gaged, a receiving member for said remote control device carried by said sleeve, means for axially maintaining said sleeve on said device, a crank lever carried by the float and the bent part of which pivots freely through said sleeve, means for axially maintaining said bent part within said sleeve, an arm fixedly mounted on said sleeve, and a forked dog carried by said arm and which straddles said lever with a small clearance.

References Cited in the file of this patent

UNITED STATES PATENTS

| | | |
|---|---|---|
| 1,231,300 | Ritz | June 26, 1917 |
| 2,198,055 | Liner | Apr. 23, 1940 |
| 2,518,928 | Paine | Aug. 15, 1950 |
| 2,569,311 | Hoare | Sept. 25, 1951 |